United States Patent Office 3,462,359
Patented Aug. 19, 1969

3,462,359
AIR BLOWN ASPHALT PITCH COMPOSITION
Eugene M. Fauber, Hammond, Ind., assignor to Sinclair Oil Corporation, New York, N.Y., a corporation of New York
No Drawing. Continuation-in-part of application Ser. No. 675,992, Oct. 17, 1967, which is a continuation of application Ser. No. 482,610, Aug. 25, 1965. This application Oct. 10, 1968, Ser. No. 766,642
Int. Cl. C10c 3/08, 1/18
U.S. Cl. 208—23      6 Claims

ABSTRACT OF THE DISCLOSURE

A composition useful as a binder is prepared by air blowing a blend of an asphalt and a propane-insoluble pitch which can be prepared by extracting with a paraffinic solvent a petroleum bottoms produced by the catalytic cracking of gas oil. The weight ratio of pitch to asphalt in the blend is from about 1/2 to 2/1. Properties of the pitch, asphalt and air blown product are given.

---

This application is a continuation-in-part of my prior copending application, Ser. No. 675,992, filed Oct. 17, 1967, which in turn is a continuation of my prior application, Ser. No. 482,610, filed Aug. 25, 1965, and both now abandoned.

This invention is directed to a novel blend of clarified oil pitch and asphalt having properties that make the blend particularly useful as a binder, for instance, in molding compositions.

A multitude of binding materials have been disclosed in the prior art of molding compositions. Depending on the properties desired and the materials available such cohesive materials as animal and vegetable resins, for instance, Congo copal resin, pine tar resin ("Vinsol") and shellac; synthetic resins such as polyvinyl chloride, polyethylene, phenol-formaldehyde resins, etc.; and petroleum distillation residues such as wax tailings have been employed alone and in numerous combinations as binders for various fillers in the manufacture of molded articles. In many molding applications a binder is sought which when employed in the manufacture of planar or relatively thin articles will donate good bending properties to the articles without their breaking or being deformed. The bending strength of molded articles can, of course, be often enhanced by the inclusion of various reinforcing fillers, such as cotton flock, glass fibers, etc., in the molding composition. It is quite frequently the case, however, that due to other desired properties in the finished articles the presence of such fibrous fillers in significant amounts is deleterious. In such instances, a binder material which will itself supply the necessary properties of resiliency when heavily filled with extending or non-reinforcing fillers is in demand.

It has now been found that an inexpensive binding material capable of forming thin molded articles of high bending strength, even when heavily loaded with non-reinforcing fillers, can be obtained by air blowing a blend of a particular clarified oil pitch with an asphalt.

The pitch component of the binder composition of this invention can be obtained by the solvent extraction of petroleum bottoms derived from gasoline-producing catalytic cracking processes. The cracked oil is the residual oil produced as a result of the cracking of suitable mineral oil cracking feedstocks such as petroleum gas oils in the presence of catalysts such as silica-alumina or other catalysts, usually silica-based cracking catalysts, which are frequently in the fluidized state. In distillation of the cracked oil, generally at about 7 to 25 p.s.i. pressure, to a maximum or end point of about 650 to 750° F., to obtain gasoline and gas oils overhead, there is produced a heavy residue or distillation bottoms containing entrained catalyst. To remove the catalyst, the residue is usually permitted to remain quiescent for a sufficient period of time to allow the catalyst particles to settle out, at which time the residue substantially free of catalyst may be decanted. In lieu of setting, the catalyst particles may be filtered or centrifuged from the oil, or such operations may be used in conjunction with settling.

In any case, there is obtained a clarified slurry oil, also referred to in the art as clarified or decant oil. Clarified oil feeds suitable for production of the pitch component of the present invention boil primarily in the range of about 400 to 1000° F., and have a 5 volume percent distillation point of at least about 500° F. and a 95 volume percent distillation point of at least about 800° F. with at least 100° F. units or even at least about 200° F. units, separating the 5 percent distillation point and the 95 percent distillation point. The clarified oil feed for solvent extraction can be the full range clarified oil, that is, the entire bottoms obtained as aforementioned by the distillation of the oil from the cracking unit or it can be suitable bottoms fractions of the full range clarified oil, for example, a bottoms fraction having a 5 volume percent distillation point of below about 700° F. obtained, for instance, by vacuum distillation of the clarified oil, usually to about 50% or less bottoms. It is preferred that the cracking unit from which the clarified feed is obtained be operated at at least 50 percent conversion of the hydrocarbon feedstock to lower boiling materials. Also, for reasonable yields of pitch from extraction, it is preferred that the clarified oil feed have an API gravity of up to about 25.

The clarified oil feed can be solvent extracted to provide the pitch component of the invention as a raffinate or bottoms phase, an upper extract phase containing solvent and deasphalted oil also being produced. Separation of the upper phase provides the pitch usually after any solvent in the raffinate is removed. Solvents suitable for use in the extraction are, for example, $C_3$ to $C_5$ paraffins, especially normal paraffins, with propane being preferred. Any solvent remaining in the pitch separated can be removed by simply heating at an elevated temperature, generally about 300° F., for a few minutes.

The solvent to oil ratios and temperatures employed in the extraction may vary depending, for example, on the boiling range of the clarified oil feed and the solvent selected, but in any event are selected to provide a pitch product having a softening point (R. & B.) of about 90–120° F.; a specific gravity, 77/77° F., of about 1.1500 to 1.1900; a minimum viscosity SUS at 210° F. of about 285 and a needle penetration at 77/77° F., 100 gms./5 sec. (ASTM–D–5) of about 40 to 300. Generally, the solvent-to-oil volume ratios employed in the extraction will fall in the range of at least about 2, say about 3 to 8:1 and the temperature utilized for the extraction will often range from about 130° F. to 200° F. Although a single extraction may provide the desired pitch, a number of extractions may be employed. The solvent extraction conditions may be those which reduce the clarified oil to at least about 5% bottoms, or raffinate, often about 5 to 50% bottoms, based on the full range clarified oil. In cases where a select bottoms fraction of the full range clarified oil is solvent extracted, the percent bottoms, based on the select fraction may of course be greater than 50%, generally up to about 60% or more.

The following Example I is included to illustrate the preparation of the clarified oil pitch component of the binder composition of the present invention.

EXAMPLE I

A clarified oil having the physical properties shown in Column 1 of Table I, below, obtained from the fluidized catalytic cracking of petroleum gas oil, was distilled by steam vacuum distillation to a 50% bottoms fraction.

The 50% bottoms fraction was then extracted with propane for seven passes, using a solvent to oil ratio of 5/1 in each pass. The extractions were made by mixing the clarified oil bottoms fraction with propane in a closed batch treating kettle for 30 minutes at the following successive pass temperatures: Four at 190° F. and one each at 180° F., 160° F. and 140° F. The mixture was permitted to settle for three hours, on each pass, until two separate phases were obtained. The deasphalted oil was drawn from the treater of each pass and additional propane added to the remaining bottoms, until after seven passes the desired pitch-like material was obtained. The pitch represented 9.7% of the full range clarified oil feed (Column 1). The small amount of propane contained in the pitch was then removed by heating for a few minutes at 300° F.

The pitch obtained had the physical properties shown in Table I, Column 2. Another pitch, shown in Column 3 of Table I, was also obtained from the 50% bottoms clarified oil in a similar manner but employing a propane-oil ratio of 7/1, with eight passes, four at 190° F., and one each at 180° F., 170° F., 160° F. and 140° F., and represented 15.6 volume percent of the full range clarified oil.

TABLE I

|  | (1) | (2) | (3) |
|---|---|---|---|
|  | Clarified oil from fluid catalytic cracking | Pitch obtained from clarified oil | Pitch obtained from clarified oil |
| Specific gravity at 77° F | 0.9660 | 1.1712 | 1.1761 |
| Softening point (R. & B.) ° F | | 111 | 113 |
| Penetration at 77° F | | 53 | 50 |
| Viscosity, Saybolt Universal at 210° F. (SUS) | 45 | 630 | 695 |
| Chemical composition, wt. percent: | | | |
| Saturates | 4.5 | | |
| Aromatics | 19.2 | | |
| Resins | 2.1 | | |
| Asphaltenes | 74.2 | | |
| Distillation: | | | |
| I.B.P., ° F | 417 | | |
| 5%, ° F | 557 | | |
| 95%, ° F | 918 | | |

In accordance with the present invention the clarified oil pitch is blended with an approximate 20–70, preferably about 60 to 70 penetration (77° F., 100 g., 5 sec.) asphalt and the blend is then air blown to produce an excellent binding material of about 245–290° F., preferably about 250 to 270° F. softening point (R. & B.). The weight ratio of pitch to asphalt in the blend may range from about 1/2 to 2/1, preferably they are present in an approximate 1/1 ratio.

The components can be blended by heating to a fluid temperature and mixing in any suitable apparatus. The air blowing conditions may be those conventionally employed in producing roofing asphalts, e.g., at temperatures of about 450 to 550° F. and air rates of about 1.2 to 3.5 cubic feet of air per hour per pound of charge. The air rate directly affects the rate of hardening, i.e., the lower the air rate employed, the greater the length of time required for hardening.

The resulting binding component will preferably possess the approximate characteristics outlined in Table II below.

Table II

| | |
|---|---|
| Penetration at 77° F., 100 g., 5 sec. | 0–2 |
| Penetration at 115° F., 50 g., 5 sec. | 1–4 |
| Insolubles in CCl$_4$, wt. percent | 0.6–1.3 |
| Specific gravity at 77° F. | 1.07–1.14 |
| Color—Jet black. | |

Binder compositions of this invention are illustrated by the following examples.

EXAMPLE II

A clarified oil pitch having the physical properties shown in Column 1 of Table III below was blended in approximately equal amounts with an asphalt having the physical properties outlined in Column 2 of Table III. Blending was accomplished by charging the pitch at about 300° F. and then the asphalt, at the same temperature, to an air blowing still. Mixing of the components was accomplished by passing nitrogen upwardly through the contents of the still. The temperature of the still and contents was raised to 500° F. over a period of two hours during the nitrogen agitation by external electric heating. At this point air was cut-in in place of the nitrogen. Conditions during the air-blowing included an air rate of 3.3 cubic feet per hour per pound of charge and a temperature of 498 to 502° F. Air-blowing was continued for 10 hours at which time the product had a softening point (R. & B.) of 260° F. Other properties of the air-blown product are shown in Column 3 of Table III.

TABLE III

| | Clarified oil pitch | Asphalt | Product |
|---|---|---|---|
| Penetration at 77° F., 100 g., 5 sec | 227 | 62 | 1 |
| Penetration at 115° F., 50 g., 5 sec | | | 2 |
| Insolubles in CCl$_4$, wt. percent | | | 1.1 |
| Specific gravity at 77° F | 1.1583 | 1.0160 | 1.1210 |
| Softening point (R. & B.) ° F | 93 | 110.6 | 260 |
| Viscosity: | | | |
| Saybolt Universal at 210° F | 404.0 | | |
| Furol at 215° F | | 190.7 | |
| Oliensis | | Negative | |

EXAMPLE III

A clarified oil pitch having the physical properties shown in Column 1 of Table III above was blended in various amounts as shown below in Table V as samples A, B and C with an asphalt having the physical properties outlined in Table IV below.

Table IV

| | |
|---|---|
| Furol viscosity at 250° F., sec. | 723 |
| Furol viscosity at 300° F., sec. | 151 |
| Penetration at 77° F., 100 g., 5 sec. | 33 |
| Penetration at 115° F., 50 g., 5 sec. | 202 |
| Softening point (R. & B.) ° F. | 131 |
| Specific gravity at 770° F. | 1.0313 |

Blending and air blowing were accomplished under conditions similar to those used in Example II above. The charge compositions and properties of the air-blown products are shown below in Table V.

TABLE V

| Composition, weight percent | A | B | C |
|---|---|---|---|
| Clarified oil pitch | 40 | 50 | 60 |
| Asphalt | 60 | 50 | 40 |
| Air-blown Product Properties: | | | |
| Specific gravity at 77° F | 1.1209 | 1.1260 | 1.1310 |
| Softening point (R. & B.) ° F | 273 | 282 | 273 |
| Needle penetration at 77° F., 100 g., 5 sec. | 1 | 1 | 1 |
| Needle penetration at 115° F., 50 g., 5 sec. | 3 | 2 | 2 |
| Insolubles in CCl$_4$, wt. percent | 0.59 | 0.75 | 1.3 |

Because of the excellent resilient strength of the binding compositions of the present invention and the jet black color thereof these binders have been found to be particularly useful as a component of phonograph records. Records prepared with 12½% and more of this unique binder possessed high bending strengths, showed excellent audio characteristics and no sign of blooming; that is, no migration to the surfaces of the records of any of the molding components.

I claim:

1. A binding material having a softening point (R. & B.) of about 245° to 290° F., prepared by air blowing a blend of (A) a propane-insoluble pitch having a specific gravity, 77/77° F., of about 1.1500 to 1.1900, a minimum viscosity SUS at 210° F. of about 285, a needle penetration at 77° F., 100 gms./5 sec. of about 40 to 300 and a softening point (R. & B.) of about 90 to 120° F., having been prepared by solvent extracting a petroleum bottoms feedstock produced from the catalytic cracking of petroleum gas oil, said feedstock boiling primarily in the range of about 400 to 1000° F. and having a 5 volume percent distillation point of at least about 500° F. and a 95 volume percent distillation point of at least about 800° F. with at least about 100° F. units separating the 5 volume percent distillation point and 95 volume percent distillation point, said solvent extracting being with a $C_3$ to $C_5$ paraffinic solvent at a solvent to oil ratio of at least about 2 to 1 and a temperature of about 130 to 200° F. to provide an extract phase and a raffinate phase and separating the phases to provide said pitch, and (B) an asphalt having a needle penetration at 77° F., 100 gms./5 sec. of about 20 to 70; the weight ratio of (A) to (B) being from about 1/2 to 2/1.

2. A binding material having a softening point (R. & B.) of about 250 to 270° F., a needle penetration at 77° F., 100 gms./5 sec. of 0 to 2, a needle penetration at 115° F., 50 gms./5 sec. of 1 to 4, 0.6 to 1.3 weight percent $CCl_4$ insolubles, and a specific gravity at 77° F. of 1.07 to 1.14, prepared by air blowing a blend of (A) a propane-insoluble pitch having a specific gravity, 77/77° F., of about 1.1500 to 1.1900, minimum viscosity SUS at 210° F. of about 285, a needle penetration at 77° F., 100 gms./5 sec. of about 40 to 300 and a softening point (R. & B.) of about 90 to 120° F., having been prepared by solvent extracting a petroleum bottoms feedstock produced from the catalytic cracking of petroleum gas oil, said feedstock boiling primarily in the range of about 400 to 1000° F. and having a 5 volume percent distillation point of at least about 500° F. and a 95 volume percent distillation point of at least about 800° F. with at least about 100° F. units separating the 5 volume percent distillation point and 95 volume percent distillation point, said solvent extracting being with a $C_3$ to $C_5$ paraffinic solvent at a solvent to oil ratio of at least about 2 to 1 and a temperature of about 130 to 200° F. to provide an extract phase and a raffinate phase and separating the phases to provide said pitch, and (B) an asphalt having a needle penetration at 77° F., 100 gms./5 sec. of about 60 to 70; the weight ratio of (A) to (B) being from about 1/2 to 2/1.

3. The binding material of claim 2 wherein the ratio of pitch to asphalt is about 1/1.

4. A binding material having a softening point (R. & B.) of about 245–290° F., prepared by air blowing a blend of (A) a propane-insoluble pitch having a specific gravity, 77/77° F., of about 1.1500 to 1.1900, a minimum viscosity SUS at 210° F. of about 285, a needle penetration at 77° F., 100 gms./5 sec. of about 40 to 300 and a softening point (R. & B.) of about 90 to 120° F., said pitch having been obtained from petroleum bottoms derived from gasoline-producing catalytic cracking processes, and (B) asphalt having a needle penetration at 77° F., 100 gms./5 sec. of about 20 to 70, the weight ratio of (A) to (B) being from about 1/2 to 2/1.

5. A binding material having a softening point (R. & B.) of about 245 to 290° F., a needle penetration at 77° F. 100 gms./5 sec. of 0 to 2, a needle penetration at 115° F., 50 gms./5 sec. of 1 to 4, 0.6 to 1.3 weight percent $CCl_4$ insolubles, and a specific gravity at 77° F., of 1.07 to 1.14 prepared by air blowing a blend of (A) a propane-insoluble pitch having a specific gravity, 77/77° F., of about 1.1500 to 1.1900, a minimum viscosity SUS at 210° F. of about 285, a needle penetration at 77° F., 100 gms./5 sec. of about 40 to 300 and a softening point (R. & B.) of about 90 to 120° F., said pitch having been obtained by the solvent extraction of petroleum bottoms derived from gasoline-producing catalytic cracking processes, and (B) asphalt having a needle penetration at 77° F., 100 gms./5 sec. of about 20 to 70; the weight ratio of (A) to (B) being from about 1/2 to 2/1.

6. The binding material of claim 5 wherein the ratio of pitch to asphalt is about 1/1.

References Cited
UNITED STATES PATENTS

| | | | |
|---|---|---|---|
| 2,774,724 | 12/1956 | Watson | 208—6 |
| 2,991,241 | 7/1961 | Renner | 208—6 |
| 3,238,116 | 3/1966 | Hamner et al. | 208—6 |
| 3,247,096 | 4/1966 | Conwell | 208—33 |
| 3,288,701 | 11/1966 | Fauber et al. | 208—22 |

HERBERT LEVINE, Primary Examiner

U.S. Cl. X.R.
106—273, 284; 208—6, 45